2,849,423
Patented Aug. 26, 1958

2,849,423

VINYL RESINS FOR APPLICATION AS SOLVENT SOLUTIONS

George P. Rowland, Jr., and Robert A. Piloni, Pottstown, Pa., assignors to The Firestone Tire & Rubber Company, Akron, Ohio, a corporation of Ohio No Drawing. Application January 13, 1956
Serial No. 558,847

16 Claims. (Cl. 260—78.5)

This invention relates to novel vinyl chloride interpolymer resins particularly adapted for dissolving in solvents for application as coatings, paints, lacquers, inks, adhesives, and the like.

Vinyl chloride resins, because of their cheapness, hardness, stability and other desirable properties, have long been considered potentially desirable as coatings, paints, lacquers, adhesives, inks, and the like. Unfortunately, however, these resins are not soluble in cheap hydrocarbons; are not compatible with alkyd resins; and do not exhibit good adhesion to metallic and other surfaces. For these reasons, the use of vinyl chloride resins in these fields has been somewhat limited.

Accordingly, it is an object of this invention to provide novel vinyl chloride resins suitable as solvent-applied coatings, paints, lacquers, inks, adhesives, and the like.

Another object is to provide such resins which are soluble in cheap hydrocarbon solvents such as benzene, toluene, xylene, and the like.

A further object is to provide such resins having good compatibility with the alkyd resins.

A further object is to provide such resins which will have good adhesion to metallic surfaces.

SYNOPSIS OF THE INVENTION

The above and other objects are secured, in accordance with this invention, by subjecting to copolymerizing conditions a mixture comprising

| | Percent |
|---|---|
| Vinyl chloride | 55–75 |
| A di-(saturated hydrocarbon) maleate, chloromaleate, or fumarate containing 6–24 carbon atoms, or a mixture of esters of this type | 14–35 |
| A mono-(saturated hydrocarbon) monohydrogen maleate, chloromaleate, or fumarate containing 5–14 carbon atoms, or a mixture of esters of this type | 5–10 |
| A saturated halogenated hydrocarbon | 1.0–6.5 |

The percentages cited are all on the basis of the total weight of the mixtures. Resins produced from mixtures within the above compositional ranges have excellent solubility in hydrocarbon solvents, are stably compatible with alkyd resins, and have good adhesion to metals. In addition to these desirable and unique properties, they also preserve unimpaired the excellent general properties of conventional vinyl chloride resins, particularly their hardness and their good resistance to aging. The resins of this invention find particular application in coatings, such as paints, especially for outdoor-exposed metal equipment; as inks; and as adhesives.

THE MALEIC AND FUMARIC DIESTERS AND HALF-ESTERS

The maleic and fumaric dihydrocarbon esters, and monohydrocarbon monohydrogen half-esters employed as starting materials in the preparation of resins in accordance with this invention are esters, within the cited classes, in which the radicals esterified by the maleic or fumaric acid are hydrocarbon radicals which contain from 1 to 10 carbon atoms and are saturated, i. e., free from ethylenic unsaturation although they may contain aromatic groups. On this basis, the diesters will contain from 6 to 24 carbon atoms, and the half-esters will contain from 5 to 14 carbon atoms. Suitable hydrocarbon groups include methyl groups, ethyl groups, normal- and iso-propyl groups, normal-, secondary and tertiary butyl groups, the several amyl groups, n-hexyl groups, cyclohexyl groups, 2-ethyl hexyl groups, phenyl groups, benzyl groups, naphthyl groups, and the like. Specific exemplary diesters include dimethyl maleate, dimethyl fumarate, diethyl maleate, di-n-butyl maleate, di-n-butyl fumarate, di-n-propyl maleate, diisopropyl maleate, diisobutyl maleate, di-secondary butyl maleate, di(2-ethyl hexyl) maleate, di(cyclohexyl) maleate, and di-benzyl maleate. Suitable half-esters include methyl hydrogen maleate, n-butyl hydrogen maleate, n-butyl hydrogen fumarate, n-propyl hydrogen maleate, benzyl hydrogen maleate, cyclohexyl hydrogen maleate, and the like. The esters used need not be pure compounds; thus mixtures of suitable dialkyl maleates and/or fumarates and mixtures of suitable monoalkyl monohydrogen maleates or fumarates may be used in lieu of pure esters of these respective types. It will also be understood that the maleates and fumarates will be indistinguishable in the product resins, since their unsaturation will be obliterated in the polymerization. A particularly useful combination of a specific dihydrocarbon ester and monohydrogen monohydrocarbon ester has been found to be the combination of (A) a commercial material offered as di-n-butyl maleate but actually containing approximately equal proportions of di-n-butyl maleate and di-n-butyl fumarate and (B) mono-n-butyl monohydrogen maleate.

THE HALOGENATED HYDROCARBONS

As set forth hereinabove, there may be employed in the process of this invention any saturated halogenated hydrocarbons, preferably those containing from 1 to 4 carbons, examples of these being the halogenated methanes such as carbon tetrachloride, carbon tetrabromide, bromochlorodifluoromethane, bromoform, methyl chloride, methyl bromide, methyl iodide, chloroform, iodoform, methylene dichloride, methylene dibromide and the like, halogenated ethanes such as ethyl chloride, 1,1,2-trichloroethane, 1,1,2,2-tetrachloroethane, ethylene chloride, ethylene bromide, ethyl bromide, ethyl iodide, 1,1,2-trichloro-2-fluoroethane, 1,1,2-tribromoethane, 1,1-dichloro-2-bromoethane, pentachloroethane and the like, and halogenated propanes and butanes such as n-propyl chloride, n-propyl iodide, isopropyl chloride, isopropyl bromide, n-butyl chloride, 1,4-dichlorobutane, t-butyl chloride, and the like. Suitable halogenated hydrocarbons containing more than 4 carbon atoms include for instance amyl chloride, dodecyl bromide, dodecyl iodide, the dichloropentanes, hexadecyl chloride and the like. If it is desired to remove these materials at the close of the reaction, resort may be had to vacuum drying or like techniques. It will be understood that, instead of the pure halogenated hydrocarbons, mixtures containing two or more of the suitable compounds may be used. The exact function of these materials in the polymerization process of this invention is not fully understood; possibly they act as chain terminators or transfer agents, or perhaps they affect the growing polymer chains in some manner not yet elucidated. At any rate, polymers prepared in the absence of these materials do not possess the desirable properties set forth hereinabove as characterizing the products produced in accordance with this invention.

THE PREPARATION OF THE INTERPOLYMERS OF THIS INVENTION

The interpolymers of this invention may be prepared by mixing together the several starting materials and subjecting them to any of the usual free-radical polymerization systems and conditions, for instance in solution in solvents, and in emulsion in aqueous media, using free-radical-generating catalysts and conditions. In practical production, however, it will usually be preferred to polymerize these materials in suspension in aqueous media by the known suspension polymerization technique. In general this technique involves suspending the monomers in an aqueous medium containing non-micelle-forming suspending agents. Suspending agents suitable for this purpose are hydrophilic high polymeric materials such as gelatin, polyvinyl alcohol, polyacrylic acid, polymaleic acid, methyl cellulose, and the like. The aqueous medium constitutes about at least half of the entire polymerization mass. The reaction is promoted by the presence of free-radical-generating agents soluble in the monomer phase of the suspension, such as benzoyl peroxide, perbenzoic acid, p-chlorobenzyl peroxide, t-butyl hydroperoxide and the like. The aqueous phase and the monomer phase are agitated together so as to suspend the latter in the former, and the temperature of the mass is adjusted to values such as to initiate the polymerization reaction, usually on the order of 30°–100° C. The monomers in the suspended droplets become polymerized, yielding a suspension of granular resin in the aqueous medium. From this aqueous suspension the resin is isolated by filtration.

PROPERTIES AND USES OF THE RESINS OF THIS INVENTION

The resins of this invention are soluble in cheap aromatic hydrocarbon solvents such as benzene, toluene, xylene, and the like in substantial proportions, say up to 30% of the total weight of the solution. Coatings formed from these solutions upon metallic and other surfaces are highly adhesive thereto and are not easily removed by abrasion or flexure of the substrate. The resins of this invention are compatible with the alkyd resins, both in solvent solutions and also in the dried films produced from solvent solutions of mixtures of the resins of this invention with alkyd resins. The resins of this invention accordingly find extensive use in coating compositions such as paints for use on metallic and other surfaces, particularly in coatings for metallic equipment subject to outside exposure conditions such as railway vehicles, automobiles, tractors, vending and dispensing machinery and the like. The resins of this invention are also very suitable for use in solvent-based inks for printing upon plastic and other surfaces. In view of their excellent adhesion to a wide variety of surfaces, the resins of this invention are further admirably adapted for use in the formulation of adhesives for joining metal, wood, plastics, and the like.

With the foregoing general discussion in mind, there are given herewith detailed examples of the practice of this invention. All parts given are by weight.

Example

| | | |
|---|---|---|
| Water (deionized) | parts | 120 |
| Vinyl chloride | do | 42 |
| Commercial di-n-butyl maleate (containing di-n-butyl fumarate to the extent of approximately 40–50%) | parts | 13 |
| Mono-n-butyl monohydrogen maleate | do | 5 |
| Benzoyl peroxide | do | 0.5 |
| Gelatin | do | 0.5 |
| Halogenated hydrocarbon (per Table I) | Per Table I | |

A series of polymerization runs was made in accordance with this invention, using various chlorinated hydrocarbons in the amounts set forth in Table I. In each case the materials were charged into a reactor (previously purged with nitrogen) and polymerized with agitation at the temperature set forth in Table I for 24 hours. The resultant suspension of resin was filtered to recover the resin, which was washed on the filter with water and dried.

Each resin was made up into a 35% solution in methyl ethyl ketone. All of the resins gave clear solutions at this concentration. Each resin was tested for adhesion to metal by coating a cleaned steel strip with the 35% resin solution, drying for 24 hours and then scraping with a knife. Excellent adhesion was obtained in each case. Finally each resin was tested for compatibility with alkyd resins by dissolving 20 grams of an alkyd resin (Glidden Co. resin 2KB551) in 20 grams of the 35% solution of the vinyl chloride resin prepared as above described. A microscope slide was dipped into the solution of alkyd and vinyl chloride resins, and dried for 24 hours. A perfectly clear film was obtained in each case. Likewise, the relative viscosity of each of the resins, in 1% cyclohexanone solution, was determined for each. Following are the particulars of the several polymerization runs.

TABLE I

| Halogenated hydrocarbon | | Benzoyl peroxide used (parts) | Polymerization temp. (° C.) | Relative viscosity | Run No. |
|---|---|---|---|---|---|
| Name | Parts used | | | | |
| Bromoform | 2 | 1 | 50 | 1.27 | 1 |
| Chloroform* | 8 | 1 | 50 | 1.35 | 2 |
| Methylene chloride | 3 | 0.5 | 65 | 1.37 | 3 |
| Sym. tetrachloroethane | 3 | 0.5 | 65 | 1.36 | 4 |
| 1,1,2-trichloroethane | 3 | 0.5 | 65 | 1.38 | 5 |
| Carbon tetrachloride | 3 | 0.5 | 65 | 1.34 | 6 |
| Iodoform | 0.85 | 0.5 | 65 | 1.33 | 7 |

*In this run 1 part of benzoyl peroxide was used.

In those of the above runs in which 2 parts of halogenated hydrocarbon were used, the ratio of vinyl chloride/dibutyl ester/monobutyl ester/ halogenated hydrocarbon was 67.8/20.9/8.1/3.2; when 8 parts of halogenated hydrocarbon were used, the ratio was 61.7/19.1/7.4/11.8; when 3 parts were used, 66.7/20.6/7.9/4.8 and when 0.85 part were used, 69/21.3/8.2/1.3.

From the foregoing general discussion and detailed specific example, it will be evident that this invention provides novel vinyl chloride resins admirably suited for applications involving solutions in aromatic hydrocarbon solvents as in coatings, lacquers, paints, inks, adhesives and the like. The resins are all characterized by good compatibility with alkyd resins and good adhesion to metallic and other surfaces.

We claim:

1. Process which comprises subjecting to a free-radical-generating catalyst and free-radical polymerizing conditions, a mixture consisting of

| | Percent |
|---|---|
| Vinyl chloride | 55–75 |
| A di-(saturated hydrocarbon) ester of an acid selected from the group consisting of maleic, fumaric and chloromaleic acids containing 6–24 carbon atoms | 14–35 |
| Mono-n-butyl monohydrogen maleate | 5–10 |
| A saturated halogenated hydrocarbon containing up to 16 carbon atoms and up to 5 halogen atoms selected from the group consisting of fluorine, bromine and iodine | 1.0–6.5 | the percentages being based on the total weight of the mixture.

2. Process which comprises subjecting to a free-radical-generating catalyst and free-radical polymerizing conditions, a mixture consisting of

| | Percent |
|---|---|
| Vinyl chloride | 55–75 |
| A mixture of di-n-butyl maleate and di-n-butyl fumarate in approximately equal proportions | 14–35 |
| Mono-n-butyl monohydrogen maleate | 5–10 |
| A saturated halogenated hydrocarbon containing up to 16 carbon atoms and up to 5 halogen atoms selected from the group consisting of fluorine, bromine and iodine | 1.0–6.5 |

3. Process which comprises subjecting to a free-radical-generating catalyst and free-radical polymerizing conditions, a mixture consisting of

| | Percent |
|---|---|
| Vinyl chloride | 66.7 |
| A mixture of di-n-butyl maleate and di-n-butyl fumarate in approximately equal proportions | 20.6 |
| Mono-n-butyl monohydrogen maleate | 7.9 |
| A saturated halogenated hydrocarbon containing up to 16 carbon atoms and up to 5 halogen atoms selected from the group consisting of fluorine, bromine and iodine | 4.8 | the percentages being based on the total weight of the mixture.

4. Process which comprises subjecting to a free-radical-generating catalyst and free-radical polymerizing conditions, a mixture consisting of

| | Percent |
|---|---|
| Vinyl chloride | 66.7 |
| A mixture of di-n-butyl maleate and di-n-butyl fumarate in approximately equal proportions | 20.6 |
| Mono-n-butyl monohydrogen maleate | 7.9 |
| Carbon tetrachloride | 4.8 | the percentages being based on the total weight of the mixture.

5. Process which comprises subjecting to a free-radical-generating catalyst and free-radical polymerizing conditions, a mixture consisting of

| | Percent |
|---|---|
| Vinyl chloride | 66.7 |
| A mixture of di-n-butyl maleate and di-n-butyl fumarate in approximately equal proportions | 20.6 |
| Mono-n-butyl monohydrogen maleate | 7.9 |
| 1,1,2-trichloroethane | 4.8 | the percentages being based on the total weight of the mixture.

6. Process which comprises subjecting to a free-radical-generating catalyst and free-radical polymerizing conditions, a mixture consisting of

| | Percent |
|---|---|
| Vinyl chloride | 66.7 |
| A mixture of di-n-butyl maleate and di-n-butyl fumarate in approximately equal proportions | 20.6 |
| Mono-n-butyl monohydrogen maleate | 7.9 |
| Symmetrical tetrachloroethane | 4.8 | the percentages being based on the total weight of the mixture.

7. Process which comprises subjecting to a free-radical-generating catalyst and free-radical polymerizing conditions, a mixture consisting of

| | Percent |
|---|---|
| Vinyl chloride | 66.7 |
| A mixture of di-n-butyl maleate and di-n-butyl fumarate in approximately equal proportions | 20.6 |
| Mono-n-butyl monohydrogen maleate | 7.9 |
| Methylene chloride | 4.8 | the percentages being based on the total weight of the mixture.

8. Process which comprises subjecting to a free-radical-generating catalyst and free-radical polymerizing conditions, a mixture consisting of

| | Percent |
|---|---|
| Vinyl chloride | 61.7 |
| A mixture of di-n-butyl maleate and di-n-butyl fumarate in approximately equal proportions | 19.1 |
| Mono-n-butyl monohydrogen maleate | 7.4 |
| Chloroform | 11.8 | the percentages being based on the total weight of the mixture.

9. A resin produced by the process of claim 13 and being characterized by good solubility in solvents, compatibility with alkyd resins and adhesion to metals.

10. A resin produced by the process of claim 4 and being characterized by good solubility in solvents, compatibility with alkyd resins and adhesion to metals.

11. A resin produced by the process of claim 5 and being characterized by good solubility in solvents, compatibility with alkyd resins and adhesion to metals.

12. A resin produced by the process of claim 6 and being characterized by good solubility in solvents, compatibility with alkyd resins and adhesion to metals.

13. A resin produced by the process of claim 7 and being characterized by good solubility in solvents, compatibility with alkyd resins and adhesion to metals.

14. A resin produced by the process of claim 8 and being characterized by good solubility in solvents, compatibility with alkyd resins and adhesion to metals.

15. Process which comprises subjecting to a free-radical-generating catalyst and free-radical polymerizing conditions, a mixture consisting of

| | Percent |
|---|---|
| Vinyl chloride | 55–75 |
| A di-(saturated hydrocarbon) ester of an acid selected from the group consisting of maleic, fumaric and chloromaleic acids containing 6–24 carbon atoms | 14–35 |
| A mono-(saturated hydrocarbon) monohydrogen ester of an acid selected from the group consisting of maleic, fumaric and chloromaleic acids containing 5–14 carbon atoms | 5–10 |
| A saturated halogenated hydrocarbon containing up to 16 carbon atoms and up to 5 halogen atoms selected from the group consisting of fluorine, bromine and iodine | 1.0–6.5 | the percentages being based on the total weight of the mixture.

16. Process which comprises subjecting to a free-radical-generating catalyst and free-radical polymerizing conditions, a mixture consisting of

| | Percent |
|---|---|
| Vinyl chloride | 55–75 |
| A mixture of di-n-butyl maleate and d-n-butyl fumarate in approximately equal proportions | 14–35 |
| A mono-(saturated hydrocarbon) monohydrogen ester of an acid selected from the group consisting of maleic, fumaric and chloromaleic acids containing 5–14 carbon atoms | 5–10 |
| A saturated halogenated hydrocarbon containing up to 16 carbon atoms and up to 5 halogen atoms selected from the group consisting of fluorine, bromine and iodine | 1.0–6.5 | the percentages being based on the total weight of the mixture.

References Cited in the file of this patent

UNITED STATES PATENTS

| Re. 24,206 | Roland et al. | Aug. 28, 1956 |
| 2,686,775 | Howard | Aug. 17, 1954 |
| 2,687,427 | Fields | Aug. 24, 1954 |

UNITED STATES PATENT OFFICE
CERTIFICATE OF CORRECTION

Patent No. 2,849,423                                      August 26, 1958

George P. Rowland, Jr., et al.

It is hereby certified that error appears in the printed specification of the above numbered patent requiring correction and that the said Letters Patent should read as corrected below.

Column 6, line 3, claim 9, for the claim reference numeral "13" read -- 15 --; line 53, list of references cited, for Re. 24,206   Roland et al - - - - - Aug. 28, 1956 read

Re. 24,206   Rowland et al - - - - Aug. 28, 1956

Signed and sealed this 22nd day of September 1959.

(SEAL)
Attest:

KARL H. AXLINE                                    ROBERT C. WATSON
Attesting Officer                                 Commissioner of Patents